United States Patent
Johns et al.

(10) Patent No.: US 8,752,291 B2
(45) Date of Patent: *Jun. 17, 2014

(54) METHOD FOR MARKING TUBES IN A SHELL AND TUBE HEAT EXCHANGER

(75) Inventors: Clifford L. Johns, Louisville, KY (US); Guillermo Camoriano, Louisville, KY (US); Bart Nuss, Fisherville, KY (US); Dennis McAndrews, Jeffersonville, IN (US); Munaf N. Chasmawala, Louisville, KY (US); Matthew Laughlin, Louisville, KY (US); Douglas K. Cornett, Louisville, KY (US)

(73) Assignee: Extundo Incorporated, Louisville, KY (US)

( * ) Notice: Subject to any disclaimer, the term of this patent is extended or adjusted under 35 U.S.C. 154(b) by 447 days.

This patent is subject to a terminal disclaimer.

(21) Appl. No.: 13/149,094

(22) Filed: May 31, 2011

(65) Prior Publication Data

US 2012/0137517 A1 Jun. 7, 2012

Related U.S. Application Data

(63) Continuation-in-part of application No. 12/882,694, filed on Sep. 15, 2010, now Pat. No. 8,511,249, which is a continuation of application No. 12/248,281, filed on Oct. 9, 2008, now Pat. No. 8,063,778.

(60) Provisional application No. 61/245,079, filed on Sep. 23, 2009, provisional application No. 60/979,191, filed on Oct. 11, 2007.

(51) Int. Cl.
*B21D 53/02* (2006.01)
*G01C 15/02* (2006.01)

(52) U.S. Cl.
USPC .................................. 29/890.03; 116/201

(58) Field of Classification Search
USPC .............. 138/104, 89–95; 29/890.03; 40/673, 40/299.01, 309, 331, 662, 663.913; 411/24–48, 907; 33/304, 313, 332, 33/502, 574–579, 613, 678; 376/206; 116/200, 201, 209, 287, 294, 298, 306, 116/307, 309, 325, DIG. 6

See application file for complete search history.

(56) References Cited

U.S. PATENT DOCUMENTS 3,223,490 A 12/1965 Sacken
4,114,654 A 9/1978 Richardson
(Continued)

FOREIGN PATENT DOCUMENTS

DE 102005027060 12/2006
EP 0311712 4/1989
(Continued)

OTHER PUBLICATIONS

A Wet Paint Sign, Author: Shaliya waya, Date: Aug. 2, 2009, Source: Wikipedia <http://en.wikipedia.org/wiki/File:Wetpain.jpg>.

*Primary Examiner* — Jacob Cigna
(74) *Attorney, Agent, or Firm* — Camoriano and Associates

(57) ABSTRACT

A method for marking a specific tube in a shell and tube heat exchanger includes inserting a marker into a second tube adjacent to the tube to be marked and directing a directional pointer on the marker toward the tube to be marked.

16 Claims, 15 Drawing Sheets

(56) References Cited

U.S. PATENT DOCUMENTS

| | | | |
|---|---|---|---|
| 4,312,708 | A | 1/1982 | Leslie |
| 4,442,716 | A | 4/1984 | Coe et al. |
| 4,493,344 | A | 1/1985 | Mathison et al. |
| 5,114,685 | A | 5/1992 | Sapoff |
| 5,439,103 | A | 8/1995 | Howes |
| 5,625,347 | A | 4/1997 | MacLean et al. |
| 5,771,835 | A | 6/1998 | Schneider |
| 6,170,530 | B1 * | 1/2001 | Steblina ............ 138/89 |
| 6,409,977 | B2 | 6/2002 | Harper et al. |
| 6,694,802 | B1 | 2/2004 | Comardo |
| 6,905,660 | B2 | 6/2005 | Harper et al. |
| 6,981,404 | B2 | 1/2006 | Johns et al. |
| 7,285,251 | B2 | 10/2007 | Johns et al. |
| 7,364,089 | B2 | 4/2008 | Claessens et al. |
| 7,765,948 | B2 | 8/2010 | Johns et al. |
| 2004/0243052 | A1 | 12/2004 | Kauphusman et al. |
| 2006/0162724 | A1 | 7/2006 | Scarrott et al. |
| 2007/0098605 | A1 | 5/2007 | Johns et al. |
| 2008/1116865 | | 5/2008 | Olsen et al. |
| 2008/0142045 | A1 | 6/2008 | Johns et al. |
| 2008/0184779 | A1 | 8/2008 | Johns et al. |
| 2005/0302388 | | 12/2008 | Johns et al. |
| 2009/0095211 | A1 | 4/2009 | Johns et al. |
| 2009/0097958 | A1 | 4/2009 | Johns et al. |
| 2009/0145727 | A1 | 6/2009 | Johns |
| 2010/0059137 | A1 | 3/2010 | Johns |
| 2012/0137517 | A1 | 6/2012 | Johns et al. |

FOREIGN PATENT DOCUMENTS

| | | |
|---|---|---|
| EP | 0967260 | 9/2008 |
| GB | 725860 | 3/1955 |
| GB | 1311434 | 3/1973 |

* cited by examiner

METHOD FOR MARKING TUBES IN A SHELL AND TUBE HEAT EXCHANGER

This application is a continuation-in-part of U.S. patent application Ser. No. 12/882,694, filed Sep. 15, 2010, which claims priority from U.S. Provisional Patent Application Ser. No. 61/245,079, filed Sep. 23, 2009, and it is a continuation-in-part of U.S. patent application Ser. No. 12/248,281, filed Oct. 9, 2008, which claims priority from U.S. Provisional Patent Application Ser. No. 60/979,191, filed Oct. 11, 2007, all of which are hereby incorporated herein by reference.

BACKGROUND

The present invention relates to shell and tube heat exchangers and, in particular, to an arrangement for marking specific tubes, for example tubes that need to be repaired, serviced differently than other tubes, left alone or otherwise corrected. Shell and tube heat exchangers that are used as chemical reactors may have many thousands of open-ended tubes. Various methods have been used in the past to mark tubes. Usually, a marker cap has been inserted into the open end of the tube being marked, but those markers can come loose when people walk on top of the tube sheet, and they require the marker to be removed in order to treat the tube. Also, when the marker is removed in order to treat the tube, the location of the tube may be lost. Other methods of marking tubes have included using paint, tape, and permanent markers on the tube sheet. However paint, tape and ink can rub off as people walk along the tube sheet.

One or more of the tubes in the chemical reactor may have thermocouples to monitor the reaction temperature during operation. The catalyst in these thermocouple tubes is loaded separately with special attention to the thermocouples and their electrical leads. It is useful to be able to temporarily seal a thermocouple tube to prevent catalyst loading in that tube while the other tubes are being loaded. Once the other tubes are loaded with catalyst, it is useful to be able to readily identify the thermocouple tubes to be separately loaded with catalyst but without obstructing the thermocouple tube to be loaded.

SUMMARY

One embodiment of the present invention provides an arrangement by which one or more directional pointers are inserted into the open ends of one or more tubes adjacent to the tube that needs to be corrected, with the pointers being directed toward the tube that needs to be corrected. The directional pointer may be secured in place by a mechanism that requires the use of a special tool in order to reduce the opportunity for it to be removed accidentally or to be removed by someone who does not have authorization. It also may include an indicator to indicate the condition of the tube, such as the type of action that needs to be taken for the tube it is marking.

Another embodiment allows easy identification of thermocouple tubes on the top tube sheet of the chemical reactor. Another embodiment is better suited for the identification of thermocouple tubes on the bottom tube sheet of the chemical reactor. Another embodiment allows the installation or removal of the device for marking the location of a thermocouple tube while the electrical leads or wires of the thermocouple extend through the marking device.

DETAILED DESCRIPTION

Figure 1:
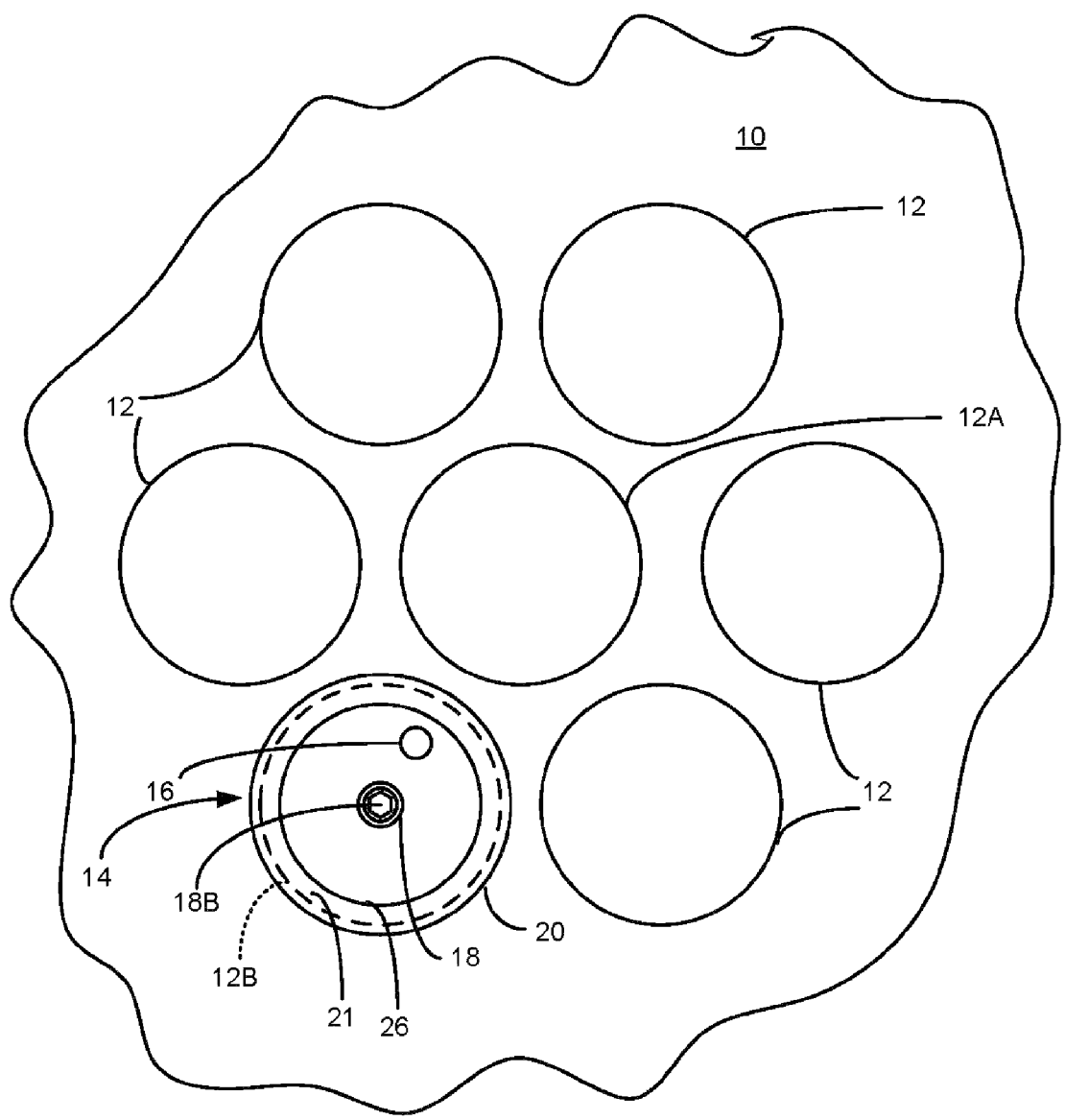
FIG. 1 is a broken away, schematic top view of a tube sheet in which a directional pointer has been inserted into a tube adjacent to a specific tube being marked.
Figure 1A:
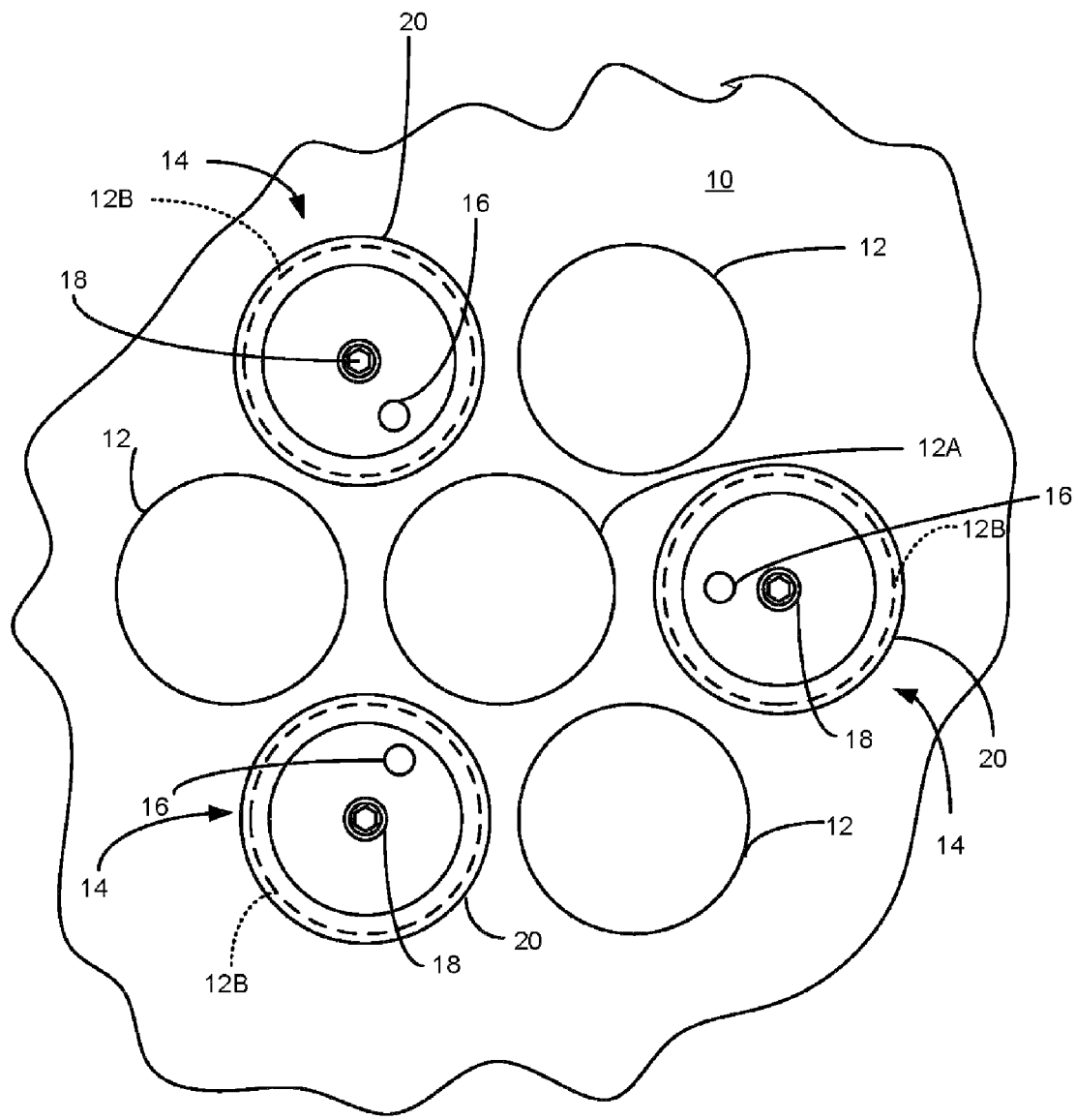
FIG. 1A is the same view as FIG. 1 but with three directional pointers inserted adjacent to the specific tube being marked.

FIG. 1 is a broken-away, schematic top view of the horizontal top tube sheet 10 of a vertical tube shell and tube heat exchanger, showing the top openings of a plurality of vertical tubes 12. In this case, the tube 12A needs to be marked, because it requires some type of attention. For example, it may have been found in a back pressure test to have a back pressure that is too high or too low, indicating some type of problem with the catalyst loading that needs to be corrected. A directional pointer 14 has been inserted into the tube 12B, which is adjacent to the tube 12A that needs to be corrected. That directional pointer 14 includes a directional indicator 16, pointing to the tube 12A. In this case, the directional indicator 16 is a small hole in the plate 26 that is offset in a radial direction from the longitudinal axis of the plate 26 (which is the same as the longitudinal axis of the directional pointer 14 and of the bolt 18).

As explained later, especially with respect to FIGS. 2-2B, it can be seen that the directional pointer 14 is secured in place by the radial expansion of a compressible cylindrical member 21, which is deformed due to compression exerted by a nut 22 threading up onto a bolt 18. This causes the cylindrical member 21 to compress in the axial direction and expand in the radial direction. The bolt 18 has a head 18A with a hexagonal-shaped recess 18B for receiving an Allen wrench having a hexagonal cross-section. Also, the directional pointer 14 includes a plate or flange 20, having a diameter that is larger than the inside diameter of the tube 12B, so the plate 20 rests on the top surface of the tube sheet 10 and prevents the directional pointer 14 from falling into the tube 12B. All the open tubes 12, 12A, 12B have the same diameter, and there may be thousands of tubes 12 secured to the tube sheet 10.

Figure 2:
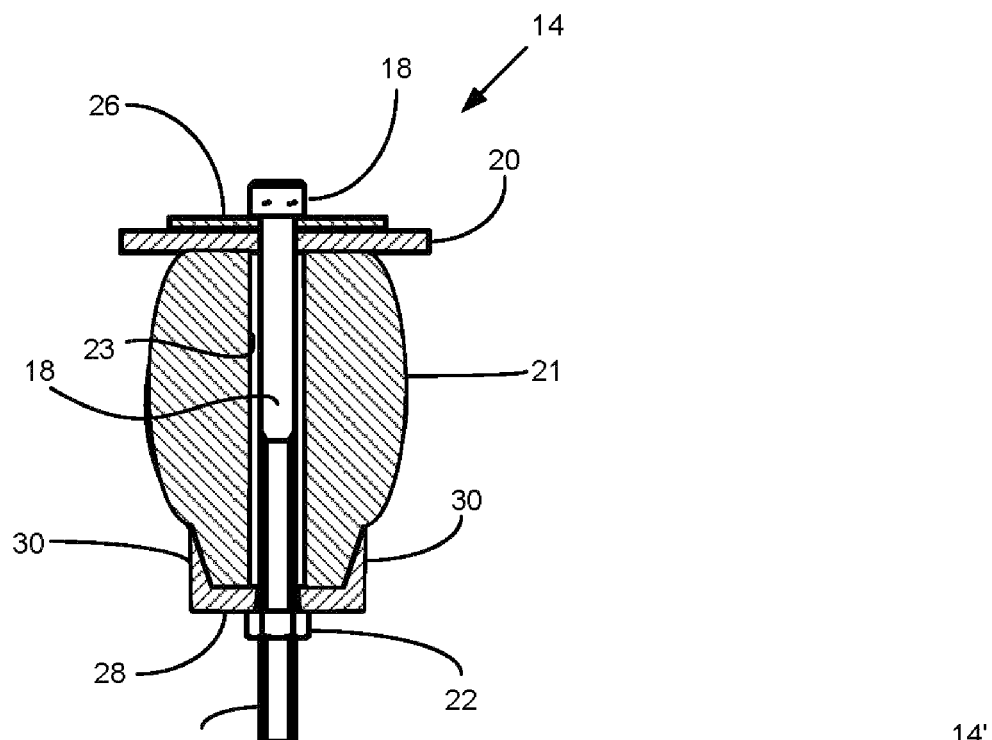
FIG. 2 is a front section view of the directional pointer of FIG. 1 in an expanded condition.
Figure 2A:
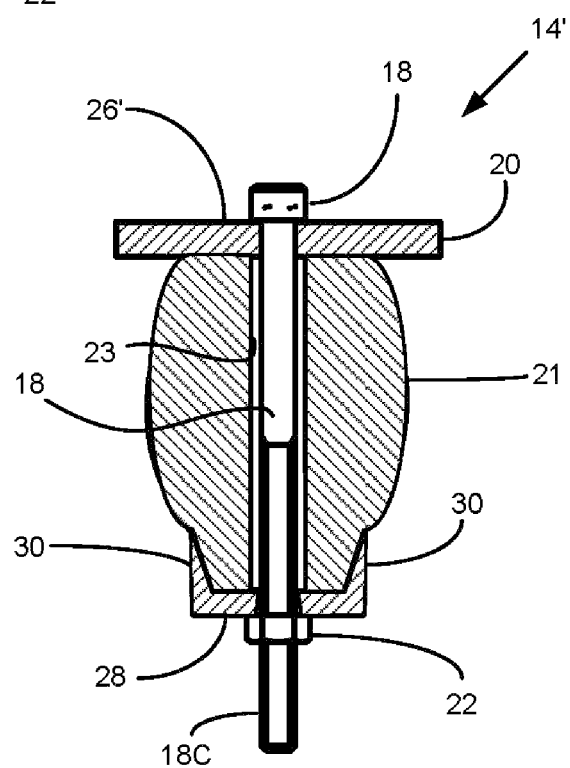
FIG. 2A is a front section view of an alternate embodiment of the directional pointer of FIG. 2.
Figure 2B:
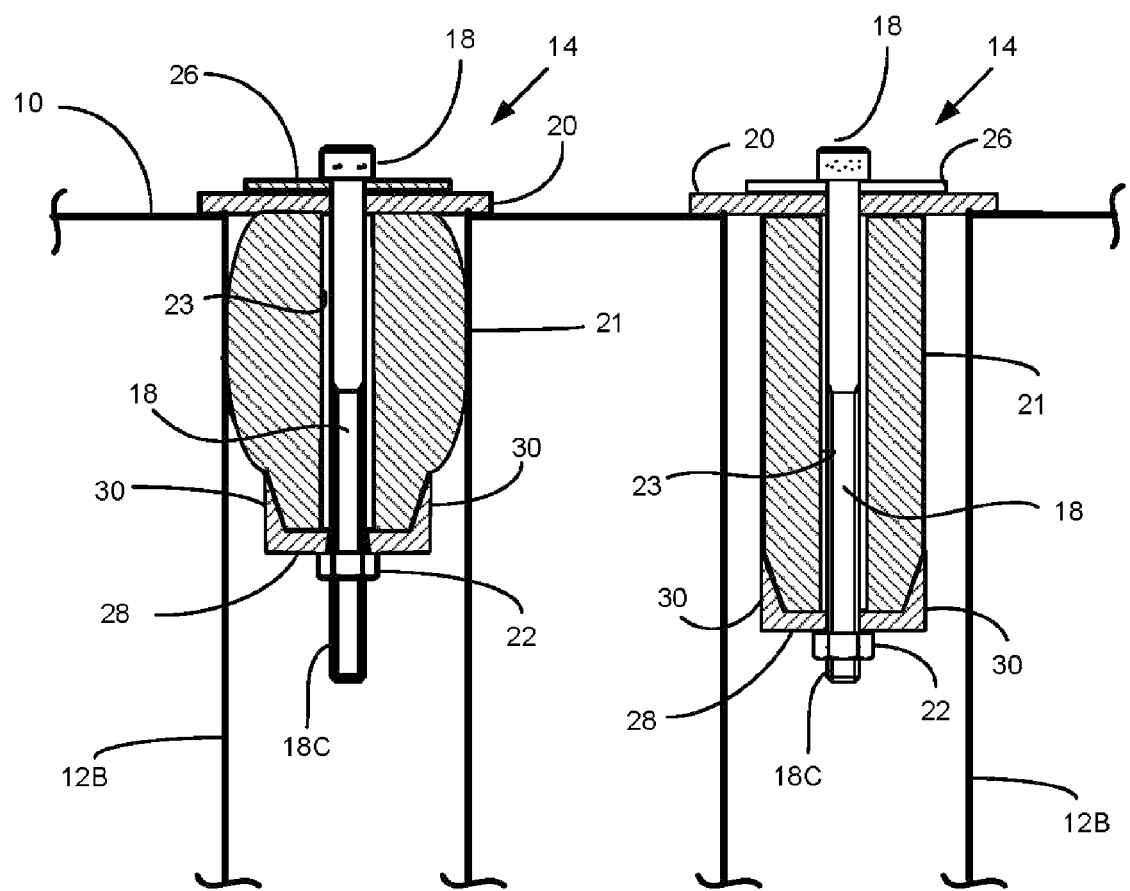
FIG. 2B is a front section view of two of the directional pointers of FIG. 2 inserted into tubes in a tubesheet, one directional pointer in an expanded condition and the other in a non-expanded condition.
Figure 4:
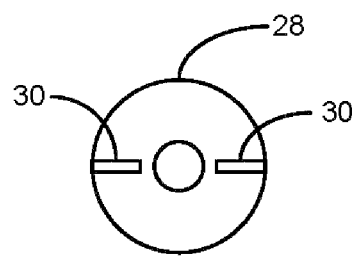
FIG. 4 is a top view of the toothed plate of the directional pointer of FIG. 2.
Figure 3:
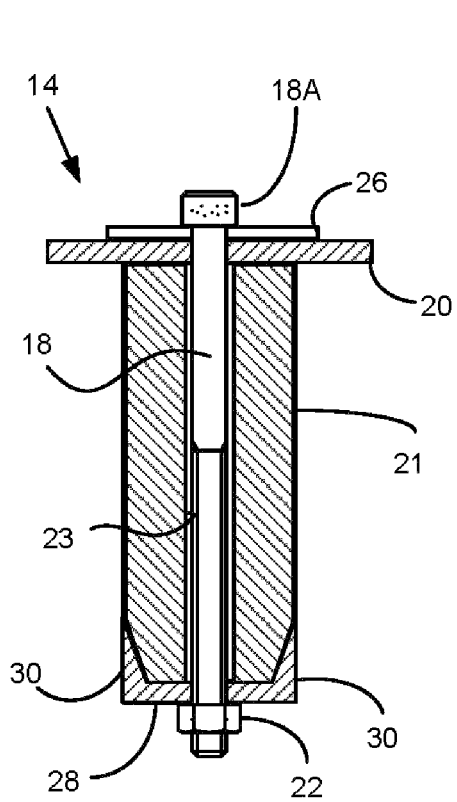
FIG. 3 is a front section view of the directional pointer of FIG. 2 in a non-expanded condition, before it is inserted into the tube.

FIGS. 2, 2B, and 3 show the directional pointer 14 in more detail. FIG. 2 and the left side of FIG. 2B show the cylindrical member 21 in an expanded condition, in which it exerts a radially outwardly-directed force against the inner surface of the wall of the tube 12B. This secures the directional pointer 14 in the tube 12B so it cannot be rotated or pulled out by hand. FIG. 3 and the right side of FIG. 2B show the cylindrical member 21 in a non-expanded condition, before it has been secured in the tube 12B.

Figure 5:
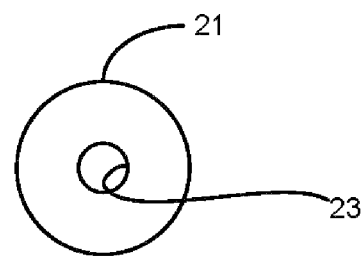
FIG. 5 is a top view of the rubber cylinder of FIG. 3.

The cylindrical compressible member 21 (made of rubber or a flexible, rubbery type of material) defines an axial hole 23 (See also FIG. 5) extending from one end to the other. A cap bolt 18 extends through a directional indicator plate 26, through the plate or flange 20, and through the axial hole 23 and has a threaded end 18C onto which a nut 22 has been threaded. As was explained earlier, the head 18A of the bolt 18 has a hexagonal-shaped recess 18B (shown in FIG. 1). The directional indicator plate 26 has an outside diameter that is somewhat less than the outside diameter of the flange 20. At the other end of the bolt 18 is a toothed plate 28 with upwardly projecting teeth 30 that dig into the compressible member 21. The nut 22 is fixed to the toothed plate 28 (or alternatively there is sufficient friction between the nut 22 and the bottom surface of the toothed plate 28) so the nut 22 does not rotate relative to the toothed plate 28 when the bolt 18 is being rotated, and since the toothed plate 28 digs into the compressible member 21, the toothed plate 28 and nut 22 also do not rotate relative to the compressible member 21. This enables the user to tighten the nut 22 up onto the bolt 18 just by rotating the head of the bolt 18. At first, the loose fit between the bolt 18 and the inner surface of the compressible member 21 at the opening 23 and the mass of the compressible member 21 prevent the compressible member 21 from rotating as the bolt is tightened, and then, as the compressible member 21 moves to its expanded state, in which it presses against the inner wall of the tube 12, the friction between the compressible member 21 and the inner wall of the tube 12 prevents the compressible member 21 (and the toothed plate 28 and the nut 22) from rotating.

When the bolt 18 is tightened (threaded into the nut 22), it causes the compressible member 21 to shorten axially and expand radially, so it presses against the inner wall of the tube 12B, causing the directional pointer 14 to be secured within the tube 12B.

If desired, the flange 20 may be secured to the compressible member 21, which would allow the worker to prevent the compressible member 21 from rotating while he is rotating the bolt 18 simply by holding the flange 20 with one hand as he rotates the bolt 18 with the other hand.

Figure 7:
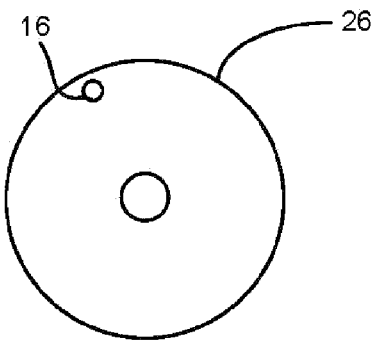
FIG. 7 is a top view of the directional pointer plate of FIG. 2.

The directional indicator plate 26 may have a variety of configurations. It may have a small hole 16 offset from the axis to serve as a directional indicator as shown in FIGS. 1, 7 and 9. The hole 16 is offset radially from the axis of the directional indicator plate 26, indicating a direction from the axis to the hole 16 which serves as a pointer that can be used to point toward the tube 12A that needs correction, as illustrated in FIG. 1. Instead of a hole 16, the directional indicator plate 26" may have a small nick or indentation 16" as shown in FIG. 8, or may bear some other reference mark, such as an arrow (not shown).

The directional indicator plates 26 also may be made in various colors, with each color indicating a different type of condition within the tube 12A to be corrected. For example, red may indicate that the pressure in the tube was too high, and yellow may indicate that the pressure in the tube was too low, violet may indicate that the height of catalyst in the tube was too low, and so forth.

Figure 8:
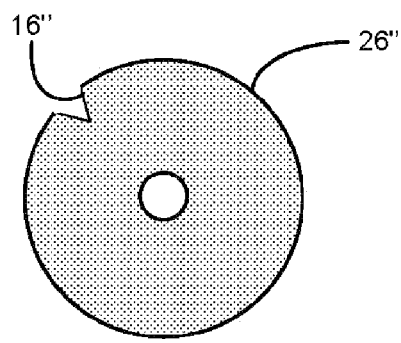
FIG. 8 is a top view of another alternative directional pointer plate.
Figure 9:
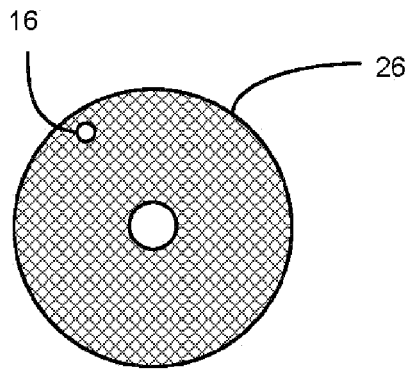
FIG. 9 is a top view of another alternative directional pointer plate.
Figure 10:
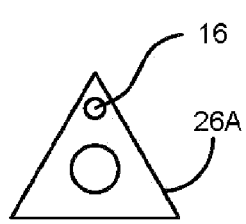
FIG. 10 is a top view of another alternative directional pointer plate.
Figure 11:
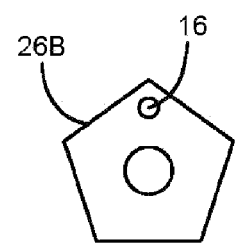
FIG. 11 is a top view of another alternative directional pointer plate.
Figure 12:
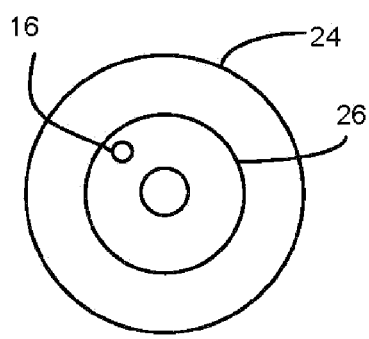
FIG. 12 is a top view of the directional pointer plate of FIG. 7 on an assembled directional pointer.
Figure 13:
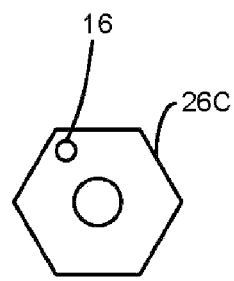
FIG. 13 is a top view of another alternative directional pointer plate.
Figure 14:
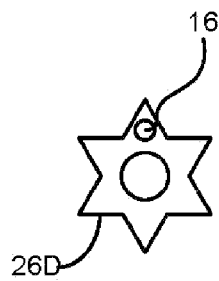
FIG. 14 is a top view of another alternative directional pointer plate.
Figure 15:
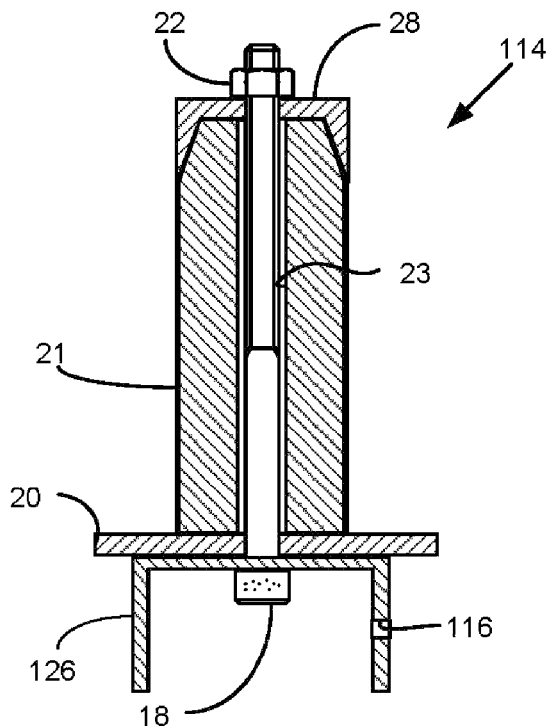
FIG. 15 is a front section view of another alternative directional pointer.
Figure 16:
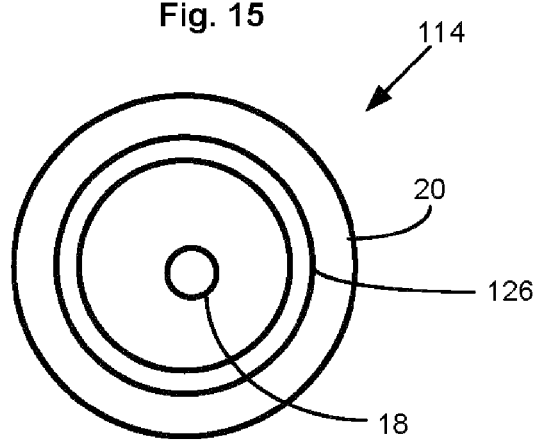
FIG. 16 is a bottom view of the directional pointer of FIG. 15.

Instead of using color to indicate the type of correction that is needed, the directional indicator plate 26" may be textured, as shown in FIG. 8, or may have a certain pattern to indicate the type of correction, as shown in FIG. 9.

Figure 6:
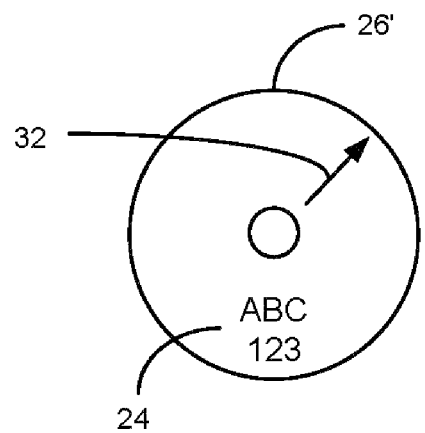
FIG. 6 is a top view of an alternate directional pointer plate for the directional pointer of FIG. 2.

The plate 26', shown in FIG. 6, does not have a hole to serve as a directional indicator or pointer but instead has markings 24 on its top surface that may serve both as a pointer and as an indication of the type of correction that is needed. Those markings may be engraved, printed, cut through the plate, or even hand-applied using a pencil, an indelible pen, a piece of tape, or the like. As explained earlier, ink or tape are not preferred for use where they can be worn off due to foot traffic, but they may be preferred for use on the bottom tube sheet, where people do not walk.

FIGS. 10, 11, 13 and 14 show various directional indicator plates 26A-D that have different shapes to indicate the type of correction that is needed.

One example of how these directional pointers 14 may be used is after a vertical tube chemical reactor has been loaded with catalyst and has been pressure tested. These directional pointers 14 may then be installed to indicate which tubes had a back pressure that was too high, which tubes had a back pressure that was too low, which tubes need to be plugged, and so forth. The directional pointers 14 also may be used on heat exchangers with horizontal tubes. The directional pointers 14 are installed by a person who has the special tool that can fit into the hex recess of the head of the bolt 18. This tool usually is L-shaped and has a cross-section that matches the hexagonal recess, with both legs of the L being long enough that the tool cannot fall into one of the tubes 12. Also, the directional pointers 14 are made so they will not come apart so there will be no loose parts that could fall into one of the tubes 12. The tool alternatively can be installed in a battery powered drill.

When using the directional pointers 14, the installer installs the directional pointer 14 in a tube 12B that is adjacent to the tube 12A that is being marked for correction, and he installs it with the pointer 16 directed toward the tube 12A that needs correction, so that the tube 12A becomes the "marked tube", that is, the tube toward which the pointer on the directional pointer 14 is pointing. He tightens the directional pointer 14 with the special tool so the pointer 16 cannot be rotated relative to the tube 12B, and the directional pointer 14 cannot be removed from the tube 12B by someone who does not have authorization to carry one of the special tools. This means that the directional indicator 16 will be directed toward the tube 12A until an authorized person comes with the special tool to rotate the bolt 18 in the opposite direction, moving the compressible member 21 to a less expanded condition, and allowing the directional pointer 14 to be removed from the tube 12B. (While a hexagonal recess is shown here, there are various known types of driving arrangements that require special tools that could be used instead, such as star-shaped, and so forth.)

The directional pointer 14 would remain in place (such as in tube 12B in FIG. 1) as the corrections are being made so the person making the corrections does not lose track of the tube 12A being corrected. The directional pointer 14 may also be used to help a worker find the corrected tubes so they can be re-tested.

After the tubes have been corrected and retested or had the desired treatment, a person with authorization to carry the special tool would then go around and remove the directional pointers 14.

It should be noted that it also would be possible to use the directional pointer 14 to provide further indication of activities that have occurred relating to the marked tube 12A. For example, a worker may use an indelible pen to mark on top of the plate 26 to indicate that the marked tube has been corrected or that it has been retested. The marking may be a symbol such as a check-mark "√" or a number sign, "#", a letter, such as "C" for "corrected" and "R" for "retested", a shape, such as an unfilled-in triangle or a filled-in square, or different colors, such as a blue mark to indicate that a correction has been done and a green mark to indicate that the tube has been retested, or anything else that will tell the workers what has been done to the marked tube.

Figure 17:
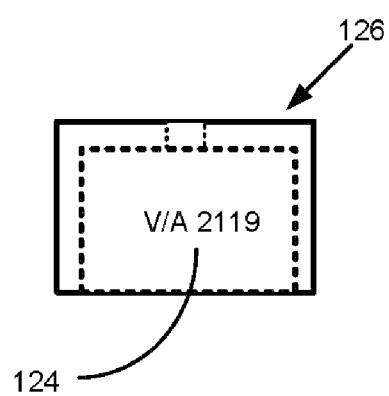
FIG. 17 is a front view of the cap of the directional pointer of FIG. 15.
Figure 18:
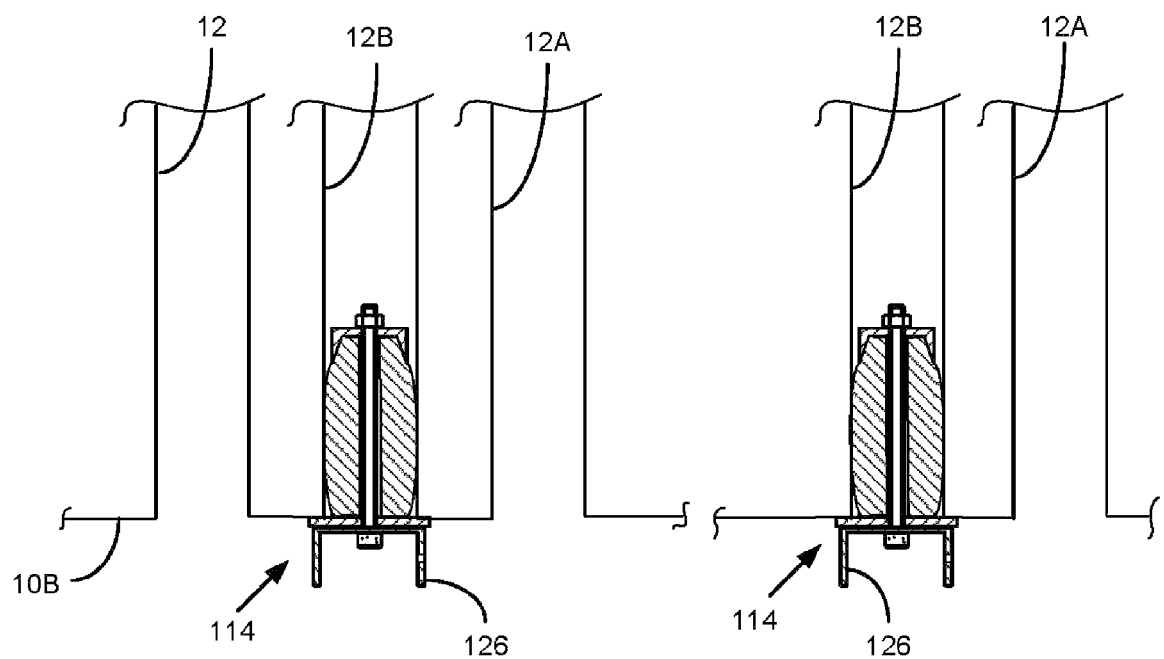
FIG. 18 is a schematic view showing the directional pointers of FIG. 15 being used on the bottom of a vertical tube shell and tube heat exchanger.

While FIG. 1 shows the directional pointers 14 being used on the top tube sheet 10 to mark the tops of the tubes 12, it also may be helpful to mark the bottom of the tubes 12 at the bottom tube sheet 10B, as shown in FIG. 18. In that case, the directional indicator plate 126 may be used in a directional pointer 114 that is otherwise very similar to the directional pointer 14. This directional indicator plate 126 differs from the original directional indicator plate 26 in that it has a cylindrical shape so it projects axially beyond the washer 20 and therefore can be seen more easily by a worker walking along the ground or on a platform below the reactor. This directional indicator plate 126 also has a hole 116 through the side wall which serves as a directional indicator or pointer. The directional indicator plate 126 may also have identification markings 124 as shown in FIG. 17 instead of, or in addition to the opening 116. It also may be made in a color or have a texture or marking or other indication of the type of correction that needs to be made. In general, it may have all the same features as the directional indicator plate that is used on the top of the tubesheet 10.

These directional pointers 114 are inserted into the bottom of the tubes 12B and point toward the adjacent tubes 12A that need to be corrected. A flag, streamer, or tag (not shown) may be tied to the directional pointer 114, for example by threading a streamer through the opening 116, to make the directional pointer 114 easier to see. The markings 124 may refer to the condition of the tube 12A to be corrected, or to some other characteristic of interest, such as the location of the tube 12B or of the tube 12A to be corrected.

Referring back briefly to FIG. 6, a line 32 (or some other reference mark) may be added by the user onto the directional indicator plate 26', either before or after the directional pointer 14 has been installed in the tube 12B. The line 32 may be added to the plate 26' by the user with a pencil, pen, decal, or other mechanism after the directional pointer has been installed and secured in the reactor tube. In this instance, there is no need to align the directional indicator of the directional pointer 14 with the tube 12A to be corrected before tightening the directional pointer 14' in place, since the line 32 is used instead as the directional indicator and this line 32 can be applied after the directional pointer is installed in the tube 12B. It also should be noted that it may be desirable for the directional indicator plate 26' to be the same as the flange or plate 20 that rests on the tubesheet rather than using a separate plate.

Figure 19:
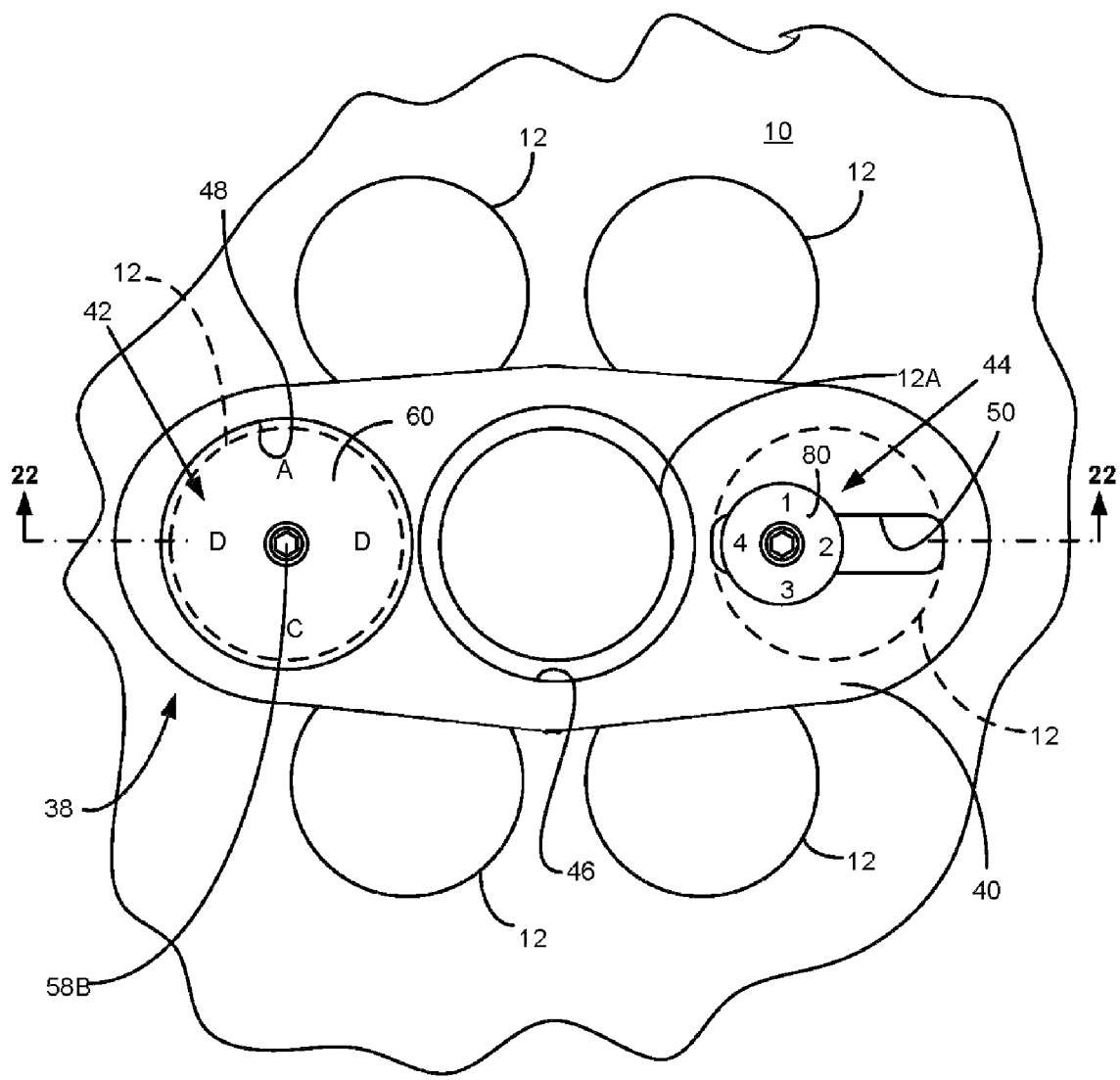
FIG. 19 is a broken away, plan view, similar to FIG. 1, but for another embodiment of a device for marking a tube installed in the tube sheet.

FIG. 19 is a plan view of an alternative directional pointer 38. This directional pointer 38 includes a flange 40, a securing member 42, and an anti-rotation member 44, as explained below. The flange 40 defines an opening 46, which, as described below, is aligned with the tube to be marked.

Figure 20A:
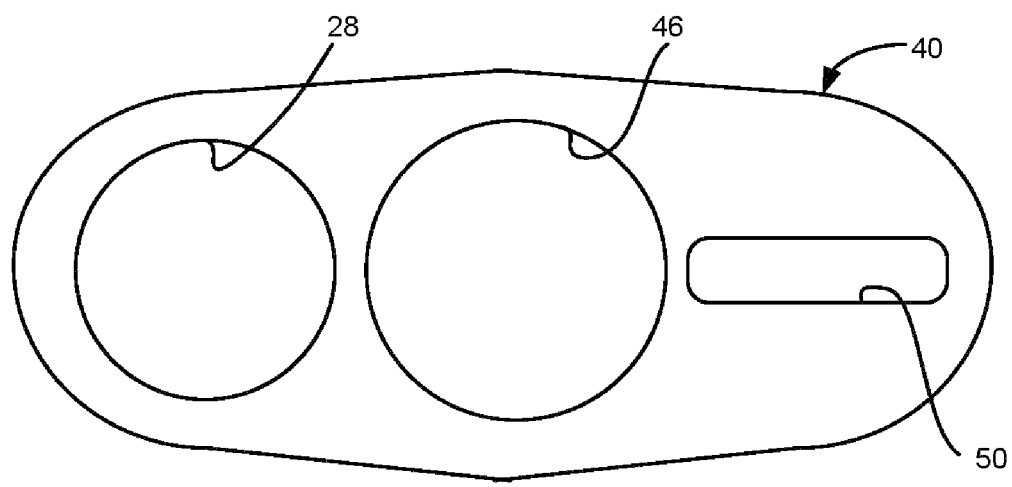
FIG. 20A is a plan view of the flange of the device of FIG. 19.
Figure 20B:
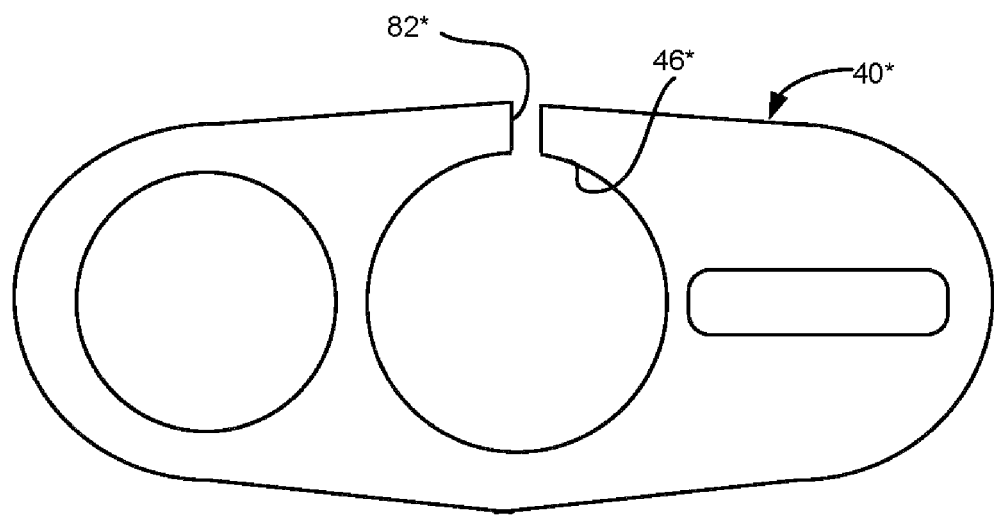
FIG. 20B is a plan view of a second embodiment of a flange to replace the flange of 20A.
Figure 22:
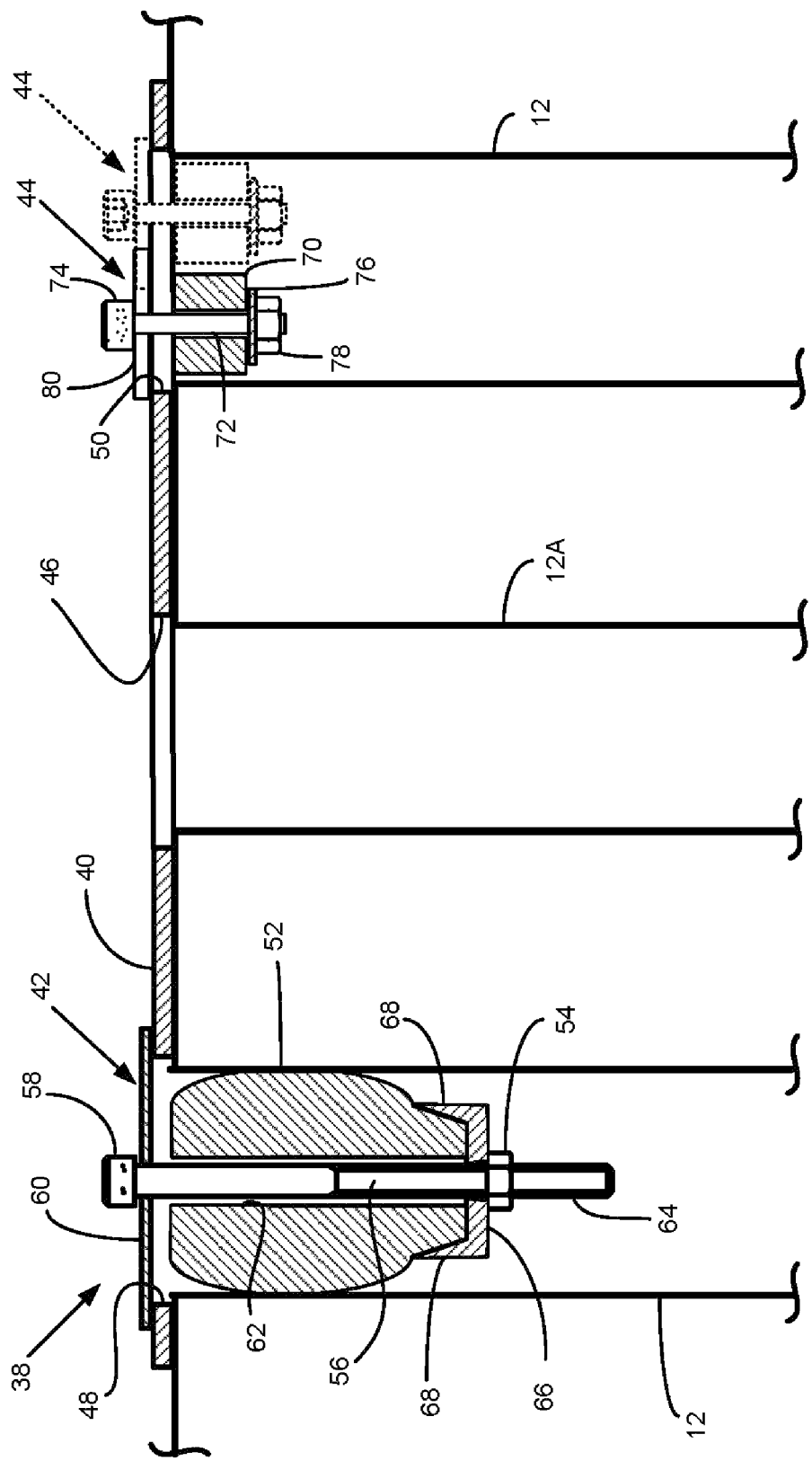
FIG. 22 is a section view along line 22-22 of FIG. 19.

Referring to FIGS. 19, 20A and 22, the flange 40 is an oval shaped, substantially flat plate sized to span across three adjacent reactor tubes 12. The circular, middle opening 46 preferably is at least as large as, and in this embodiment slightly larger than, the inside diameter of the reactor tubes 12. However, the middle opening 46 could be smaller than the inside diameter of the tubes 12, if desired. FIG. 20B shows an alternative embodiment of a flange 40\*, which defines a slot 82\* extending from the outer edge to the central opening 46\* and can be used to permit a thermocouple lead wire to pass through the central opening 46\* in the flange 40\* as will be described later.

As shown in FIG. 19, the opening 46 is aligned with the reactor tube 12A that is being marked. The flange 40 also defines another circular opening 48 to one side of the middle opening 46, and a slotted opening 50 on the other side of the middle opening 46. Referring to FIG. 22, it can be seen that the securing member 42 is secured in place by the radial expansion of a compressible cylindrical member 52, which is deformed due to compression exerted by a nut 54 threading up onto a bolt 56. This causes the cylindrical member 52 to compress in the axial direction and expand in the radial direction to secure the securing member 42 against the inner surface of the tube 12, as was described earlier with respect to the directional pointer of FIG. 1. The bolt 56 has a head 58 with a hexagonal-shaped recess 58B for receiving an Allen® wrench having a hexagonal cross-section. Also, the securing member 42 includes a plate 60, having a diameter that is larger than the diameter of the opening 48 in the flange 40, so the plate 60 rests on the top surface of the flange 40 and prevents the securing member 42 from falling into the tube 12. The plate 60 may have various indicators on its top surface to indicate the condition of the tube 12A, as desired. In this embodiment, it has the letters A, B, C, D spaced apart at 90 degree intervals. It also could include an indicator 26 or 126 as shown in FIGS. 3-18 and described earlier.

The anti-rotation member 44 (See FIGS. 19 and 22) is similar to the securing member 42 except that it does not have a compressible member to expand axially to secure against the wall of the tube 12. While the plug 70 of the anti-rotation member 44 could be made out of a compressible material, similar to that of the compressible member 52, in this particular embodiment, the plug 70 is made from a non-compressible material, such as metal, wood, or a hard plastic, such as Nylon® (DuPont). Other than this difference, the anti-rotation member 44 is similar to the securing member 42, including a bolt 72 with a hex head 74, a lower washer 76, a nut 78 threaded onto the threaded end of the bolt 72, and an upper washer 80. The upper washer 80 or plate has a larger diameter than the width of the slot 50 in the flange 40 and may have indicators on its top surface to indicate the condition of the tube 12A. In this example, the numbers 1, 2, 3, 4 are located at 90 degree intervals on the washer 80. The plug 70 has a diameter which is substantially smaller than the inside diameter of the tube 12. This allows the anti-rotation member 44 to slide along the slotted opening 50 in the bridging flange 40 (as shown in phantom in FIG. 22) to adjust to any changes in pitch (center to center distance) of the tubes 12.

Once assembled onto the flange 40, the anti-rotation member 44 need not be removed. However, the bolt 72 may be loosened slightly from the nut 78 to allow the anti-rotation member 44 to slide along the slotted opening 50 of the bridging flange 40 in order to snug up the anti-rotation member 44 against the inner wall of the tube 12, which helps secure the directional pointer 38 in position, ensuring that the opening 46 in the flange 40 remains aligned with the tube 12A (See FIG. 19). Also, the bolt 72 may be loosened slightly to allow the user to rotate the washer 80 so a different indicator is directed toward the marked tube 12A to indicate a change in the condition of the marked tube 12A, and then the bolt 72 may be tightened again.

Figure 21:
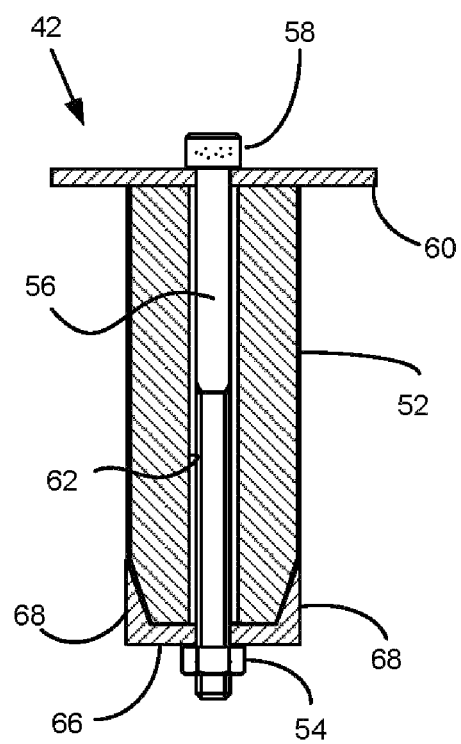
FIG. 21 is a section view of a securing mechanism which is part of the device for marking a tube of FIG. 19.

One example of how the directional pointer 38 may be used is explained below. Initially it is desirable to load all the tubes 12 with catalyst except the tube 12A which will house a thermocouple. This tube 12A should be kept empty so that a thermocouple (not shown) may be installed later. Therefore, the securing member 42 shown in FIG. 21 is installed in the tube 12A. The plate 60 covers the opening of the tube 12A to prevent any catalyst particles from entering the tube 12A.

Once the chemical reactor has been satisfactorily loaded with catalyst, the sealing member 42 is removed from the tube 12A in preparation for installing a thermocouple in the tube 12A. However, all the tubes 12 and 12A look identical when standing on top of the upper tube sheet 10. To prevent losing track of the thermocouple tube 12A, the directional pointer 38 is installed, with its opening 46 placed over the marked tube 12A, as seen in FIG. 19, prior to removing the securing member 42 that is in the marked tube 12A. In this situation, the flange 40* of FIG. 20B would be used.

The directional pointer 38 provides unhindered access to the marked tube 12A to allow for the placement of a thermocouple inside the marked tube 12A and for the loading of catalyst after the thermocouple has been installed, while providing a visual indication of the location of the marked tube 12A, and does so with substantially only the hex heads 58, 74, of the securing member 42 and anti-rotation member 44 respectively, projecting above the upper tube sheet 10. This allows the personnel working on the upper tube sheet 10 to have full access to the complete upper tubesheet 10 and to the thermocouple tube 12A with essentially no tripping hazard.

The indicators on the plate 60 or 80 may be used to indicate the condition of the tube 12A during the process. For example, one of the indicators may be rotated to a first position to indicate that the marked tube 12A is empty, and the other indicator may be rotated to a first position to indicate that a thermocouple needs to be installed in the marked tube 12A. Then, the second indicator may be rotated to indicate that the thermocouple has been installed, and, finally, the first indicator may be rotated to a second position to indicate when the marked tube is loaded with catalyst. After the thermocouple has been installed and the tube has been loaded with catalyst, it may be back-pressure tested, and then the directional pointer would be removed.

It is common for electrical leads to extend upwardly from the thermowell out of the top of the tube 12A, and the slot 82* facilitates the removal of the directional pointer 38 from the tube sheet 10 by allowing the electrical wire to pass out of the opening 46* and through the slot 82*. Other types of sensors or other devices may project out of the top or bottom of the reactor tube, and they also may be accommodated by using the slot 82*.

Figure 23:
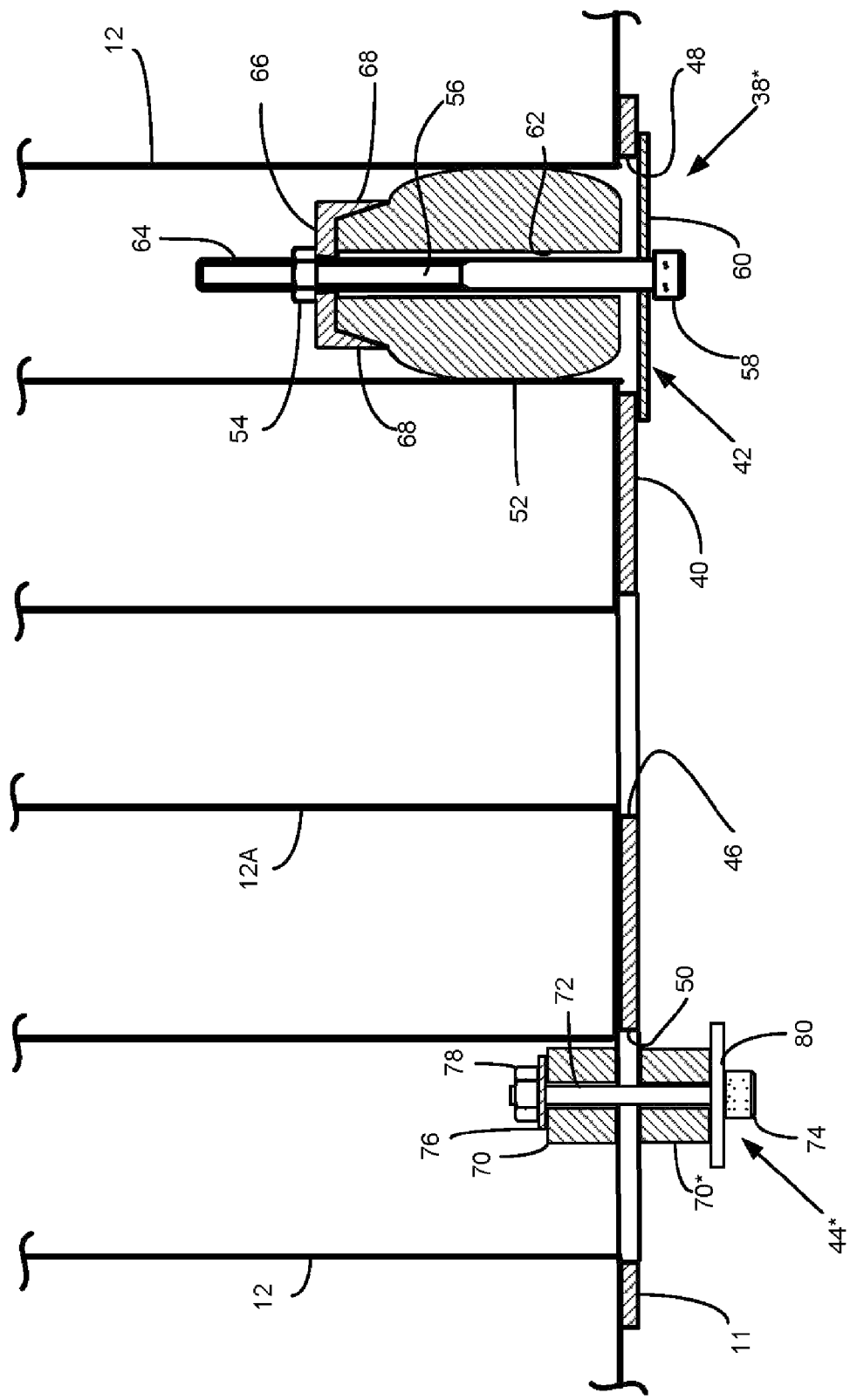
FIG. 23 is a section view, similar to FIG. 22, but for another embodiment of a device for marking a tube, in this instance installed in a bottom tube sheet.

FIG. 23 shows another embodiment of a directional pointer 38*, preferably for use on the lower tubesheet 11 of a chemical reactor. A comparison with the directional pointer 38 of FIG. 22 shows that these two devices 38, 38* are essentially identical except for the anti-rotation member 44* which has a second plug 70* located between the washer 80 and the flange 40. This second plug 70*, the washer 80 and the head 74 of the bolt 72 project from the bottom of the lower tubesheet 11 to make it easier for personnel to spot the directional pointer 38*. The circumferential surface of the second plug 70* may be used to further identify the tube 12A by placing, for instance, an inscription (not shown) on the surface, such as T1 (Thermocouple 1). Other than this difference, the directional pointer 38* operates in substantially the same manner as the directional pointer 38 described earlier.

Figure 24:
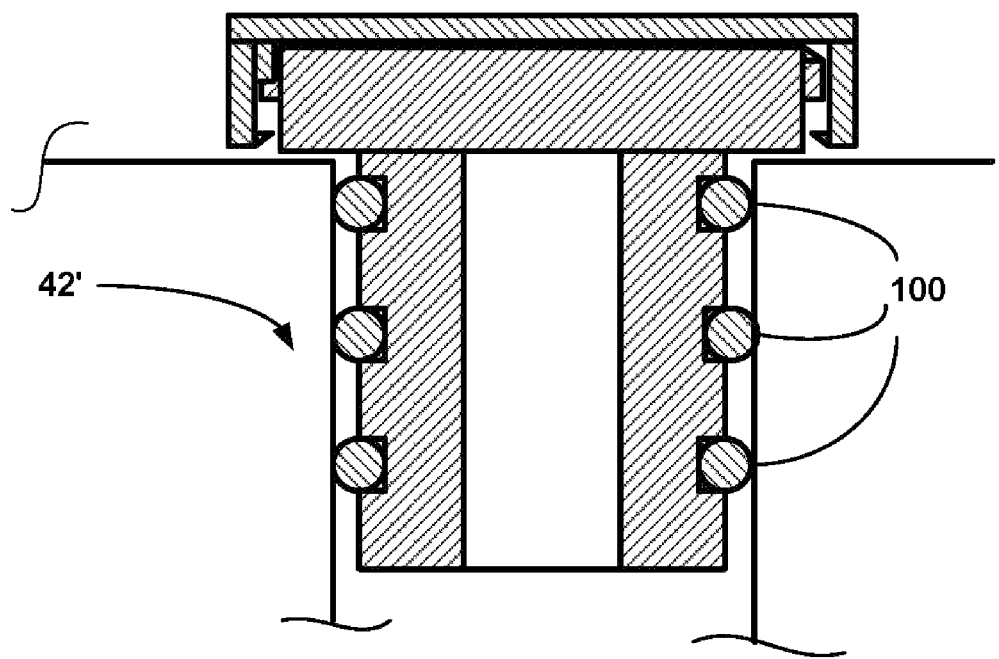
FIG. 24 shows an alternate directional pointer.
Figure 25:
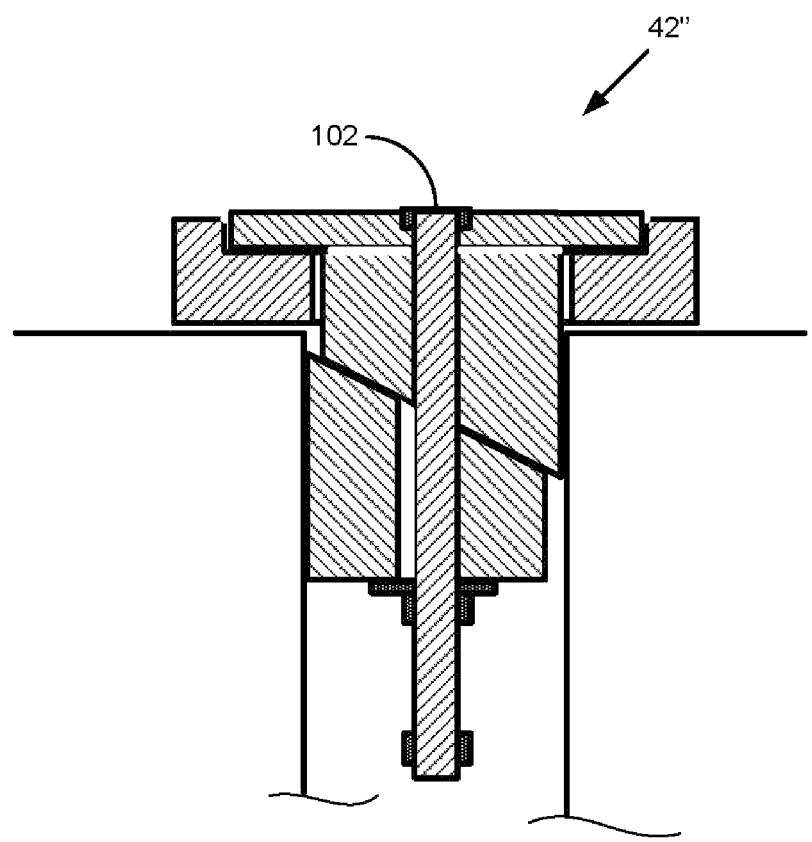
FIG. 25 shows still another alternate directional pointer.

FIGS. 24 and 25 show two alternative types of securing members that may be used instead of the securing member 42.

In FIG. 24, the securing member 42' uses O-rings 100 to press against the inner surface of the wall of the tube 12.

In FIG. 25, the securing member 42" uses a wedging arrangement to expand against the inner surface of the tube 12. As the bolt 102 is tightened, the wedge elements are pressed together and slide relative to each other to expand the diameter of the securing member 42" and press against the inner surface of the tube 12.

It will be obvious to those skilled in the art that various modifications may be made to the embodiments described above without departing from the scope of the present invention as claimed.

What is claimed is:

1. A method for marking a specific tube in a shell and tube heat exchanger that includes a tube sheet and a plurality of open-ended tubes extending from the tube sheet, comprising the steps of:
   providing a flange defining a first opening and having a first projection extending perpendicular to the flange;
   inserting the first projection into one of the tubes near the specific tube that is being marked; and
   aligning the first opening with the specific tube that is being marked.

2. A method for marking a specific tube in a shell and tube heat exchanger as recited in claim 1, and further providing an indicator means secured to the flange to indicate the condition of the specific tube being marked, and including the step of changing the indicator means to indicate a change in the condition of the specific tube being marked.

3. A method for marking a specific tube in a shell and tube heat exchanger as recited in claim 1, wherein the flange has an outer edge and defines a slot extending from the first opening to the outer edge.

4. A method for marking a specific tube in a shell and tube heat exchanger as recited in claim 3, wherein there is a wire extending out of the open end of the specific tube being marked, and further comprising the step of introducing the wire through the slot and into the first opening in order to align the first opening with the specific tube being marked.

5. A method for marking a specific tube in a shell and tube heat exchanger as recited in claim 1, wherein the tube being marked has an inside diameter and the first opening in the flange is at least as large as the inside diameter of the specific tube being marked.

6. A method for marking a specific tube in a shell and tube heat exchanger as recited in claim 5, and further comprising the step of securing the flange to ensure that the first opening remains aligned with the specific tube that is being marked.

7. A method for marking a specific tube in a shell and tube heat exchanger as recited in claim 6, wherein the step of securing the flange includes providing a second projection perpendicular to the flange and inserting the second projection into a second tube near the specific tube that is being marked.

8. A method for marking a specific tube in a shell and tube heat exchanger as recited in claim 6, wherein the one tube into which the first projection has been inserted has an inner surface and the step of securing the flange includes expanding the first projection against the inner surface of the one tube into which the first projection has been inserted.

9. A method for marking a specific tube in a shell and tube heat exchanger as recited in claim 8, wherein the step of securing the flange includes providing a second projection perpendicular to the flange and inserting the second projection into a second tube near the specific tube being marked.

10. A method for marking a specific tube in a shell and tube heat exchanger as recited in claim 9, and further providing an indicator means secured to the flange to indicate the condition of the specific tube being marked, and including the step of changing the indicator means to indicate a change in the condition of the specific tube being marked.

11. A method for marking a specific tube in a shell and tube heat exchanger as recited in claim 9, wherein the flange has an outer edge and defines a slot extending from the first opening to the outer edge, there is a wire extending out of the open end of the specific tube being marked, and further comprising the step of introducing the wire through the slot and into the first opening in order to align the first opening with the specific tube being marked.

12. A method for marking a specific tube in a shell and tube heat exchanger as recited in claim 11, and further providing an indicator means secured to the flange to indicate the condition of the specific tube being marked, and including the step of changing the indicator means to indicate a change in the condition of the specific tube being marked.

13. A method for marking a tube in a shell and tube heat exchanger, comprising the steps of:
  identifying a first tube that needs to be corrected;
  inserting a marker into a second tube adjacent to the first tube, said marker including a directional pointer, and directing the directional pointer toward the first tube; and
  securing the marker within the second tube so its position is fixed relative to said first tube and it cannot be removed accidentally.

14. A method for marking a tube as recited in claim 13, wherein the second tube has an inner surface and the step of securing the marker within the second tube includes expanding the marker against the inner surface of the second tube.

15. A method for marking a tube as recited in claim 14, wherein the directional pointer extends beyond the first tube and defines an opening, and wherein the step of directing the directional pointer toward the first tube includes aligning the opening with the first tube.

16. A method for marking a tube as recited in claim 15, and further comprising the step of providing an indicator means secured to the marker to indicate the condition of the first tube, and including the step of changing the indicator means to indicate a change in the condition of the first tube.

* * * * *